C. A. JANSSON.
SHAFT COUPLING.
APPLICATION FILED JAN. 4, 1912.
1,092,574.
Patented Apr. 7, 1914.
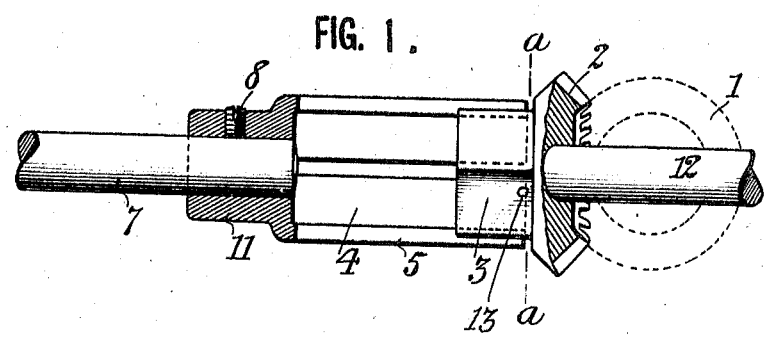
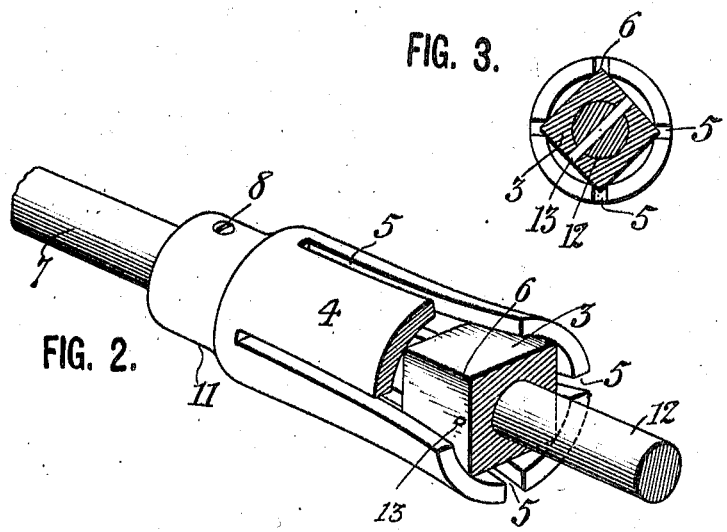
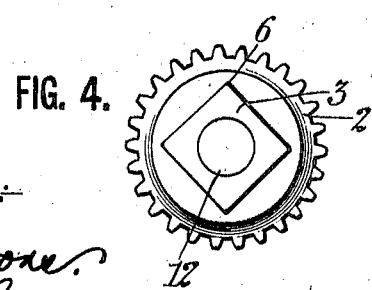
Witnesses:
Inventor:
Charles A. Jansson
by B. B. Stickney
his Attorney

UNITED STATES PATENT OFFICE.

CHARLES A. JANSSON, OF NEW YORK, N. Y., ASSIGNOR TO UNDERWOOD COMPUTING MACHINE COMPANY, OF NEW YORK, N. Y., A CORPORATION OF NEW YORK.

SHAFT-COUPLING.

1,092,574.      Specification of Letters Patent.      Patented Apr. 7, 1914.

Application filed January 4, 1912. Serial No. 669,324.

*To all whom it may concern:*

Be it known that I, CHARLES A. JANSSON, a subject of the King of Sweden, residing in Brooklyn borough, city of New York, in the county of Kings and State of New York, have invented certain new and useful Improvements in Shaft-Couplings, of which the following is a specification.

This invention relates to a safety coupling, and may be used in a computing machine for protecting the mechanism in case it should be out of adjustment, or become jammed, so that the parts will not be strained or broken.

I provide a clutch or grip in the form of a sleeve or hollow head, having preferably a plurality of slots into which is inserted a square or prismatic shank, boss, or hub, to rotate the sleeve; the corners of the shank or boss working in the slots of the sleeve, and the latter having a yielding construction, to permit the shank to slip, when the machine becomes overloaded or jammed.

In the accompanying drawings, Figure 1 is a sectional elevation showing the squared shank with its corners positioned in the slots of the slotted sleeve or head. Fig. 2 is a perspective view of the clutch showing the shank in the act of rotating within the sleeve. Fig. 3 is a section on the line *a—a*, Fig. 1, showing the relative positions of the corners and slots. Fig. 4 is an end view of the shank and gear.

A motor or driver may be connected to a gear 1, which rotates a gear 2, having a hub or shank 3, having corners 6 engaged within slots 5 of a gripping sleeve 4, which has a hub 11 and is connected to a shaft 7 by a screw 8. The gear 2 and shank 3 may be fastened to a shaft 12 by a pin 13. As the shank 3 has its corners 6 projecting into the slots 5, rotation will be transmitted by reason of the corners engaging the edges of the slots 5. If the machine should be jammed, the driving shank or hub will continue to rotate, the corners 6 spreading or opening the yielding head, or causing the yielding fingers or members 4 to spring outwardly without endangering the other parts of the machine. The clatter caused by the repeated opening and closing of the spring grip will signal to the operator that the machine is out of order.

Various modifications may be resorted to without departing from the spirit and scope of my invention.

Having thus described my invention, I claim:

1. A safety coupling comprising a driven member and a driving member, one of said members having sides constructed to spring outwardly, the other member having corners adapted to force the sides of the first member to spring outwardly, so that the second member can slip within said first member.

2. The combination of a slotted yielding tubular grip, and a prismatic clutch member inserted in said grip and having corners inserted in the slots of said grip.

3. A safety coupling comprising a head or grip having sides adapted to spring outwardly, and a member having corners adapted to force the sides of the first member to spring outwardly, said first member having a plurality of slots for receiving the corners of said second member.

4. A coupling comprising a hollow rotary member slotted to form elastic sections and a coöperating member frictionally engaging the slotted portion of the hollow member, said sections being yieldable in a direction to permit relative rotation of the members.

5. In a coupling, the combination of a hollow member slotted to form an elastic arm yieldable in a radial direction, and a member formed with a projection in frictional engagement with a slot of the hollow member, and operable under excessive strain to cause said arm to yield in a radial direction and thereby permit relative rotation of the coupling members.

CHARLES A. JANSSON.

Witnesses:
  WM. H. FREY,
  G. O. DEGENER.